US007606626B2

(12) United States Patent
Leung

(10) Patent No.: US 7,606,626 B2
(45) Date of Patent: Oct. 20, 2009

(54) SPEAKING THERMOMETER

(75) Inventor: Ka Y Leung, Austin, TX (US)

(73) Assignee: Silicon Labs CP, Inc., Austin, TX (US)

(*) Notice: Subject to any disclaimer, the term of this patent is extended or adjusted under 35 U.S.C. 154(b) by 668 days.

(21) Appl. No.: 10/872,675

(22) Filed: Jun. 21, 2004

(65) Prior Publication Data

US 2005/0283261 A1 Dec. 22, 2005

(51) Int. Cl.
*G06F 17/00* (2006.01)

(52) U.S. Cl. .......................... 700/94; 374/100; 702/130

(58) Field of Classification Search ....................... None
See application file for complete search history.

(56) References Cited

U.S. PATENT DOCUMENTS 4,727,310 A * 2/1988 Hashimoto et al. .......... 324/157
6,169,442 B1 * 1/2001 Meehan et al. .............. 327/513
6,300,871 B1 * 10/2001 Irwin et al. ............ 340/539.28

* cited by examiner

*Primary Examiner*—Walter F Briney, III
(74) *Attorney, Agent, or Firm*—Howison & Arnott, L.L.P.

(57) ABSTRACT

A portable self contained parameter sensing unit for sensing environmental parameters and communicating such to a user. The unit includes a housing having a transducer for conveying information to the user and an integrated circuit. The integrated circuit includes an integrated environmental sensor for sensing current predetermined environmental parameters in the analog domain. It also includes a data converter for converting the sensed current predetermined environmental parameters in the analog domain to the digital domain as digital sensed environmental parameters. An integrated memory is provided for storing information in the digital domain with an integrated processing unit for processing the sensed current predetermined environmental parameters in the digital domain in accordance with translation parameters stored in the integrated memory for conversion such that the digital value of the sensed environmental parameters are translated into a translated value that can be provided to a user. An integrated driver drives an external transducer with a signal representing the digital value of the translated sensed environmental parameters. The overall unit has a power source for powering the integrated circuit and the transducer.

13 Claims, 3 Drawing Sheets

SPEAKING THERMOMETER

TECHNICAL FIELD OF THE INVENTION

The present invention pertains in general to single-chip devices that allow audible output of sensed environmental parameters and, more particularly, to a single-chip device that allows an audible output to be provided to a user of the current temperature.

BACKGROUND OF THE INVENTION

In the early 1970's, a great deal of research was done on synthesized speech. The need for this was in the area of computerized systems that could actually provide audible information in the form of commands, directions, etc. to a listener. This technology found a use in the game market and such companies as Texas Instruments developed algorithms for generating speech, such as the linear predictive coding (LPC) algorithm, a technique for synthesizing audible speech patterns. At this time, memory was quite expensive and the density thereof was inadequate to provide for storage of pre-recorded information that was digitized, so a hardware based algorithm was more practical. Some of the early integrated circuits that provided for the output of audible sounds through LPC based algorithms involved such things as "talking greeting cards" wherein a chip and associated battery with an integrated speaker were disposed within a greeting card such that, when the greeting card was opened, a greeting was provided. Some of the original greeting cards had "canned" greetings. With the advent of technology, audible files have been compressed in what is termed as a "WAV" file such that music and voice can be transferred over computer networks such as packet-switched networks. However, one of the limiting factors to incorporating these WAV files into small integrated circuits or hybrid circuits is the requirement for the memory to store the information that is to be played back and the ability to adaptively record such information.

SUMMARY OF THE INVENTION

The present invention disclosed and claimed herein, in one aspect thereof, comprises a portable self contained parameter sensing unit for sensing environmental parameters and communicating such to a user. The unit includes a housing having a transducer for conveying information to the user and an integrated circuit. The integrated circuit includes an integrated environmental sensor for sensing current predetermined environmental parameters in the analog domain. It also includes a data converter for converting the sensed current predetermined environmental parameters in the analog domain to the digital domain as digital sensed environmental parameters. An integrated memory is provided for storing information in the digital domain with an integrated processing unit for processing the sensed current predetermined environmental parameters in the digital domain in accordance with translation parameters stored in the integrated memory for conversion such that the digital value of the sensed environmental parameters are translated into a translated value that can be provided to a user. An integrated driver drives an external transducer with a signal representing the digital value of the translated sensed environmental parameters. The overall unit has a power source for powering the integrated circuit and the transducer.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
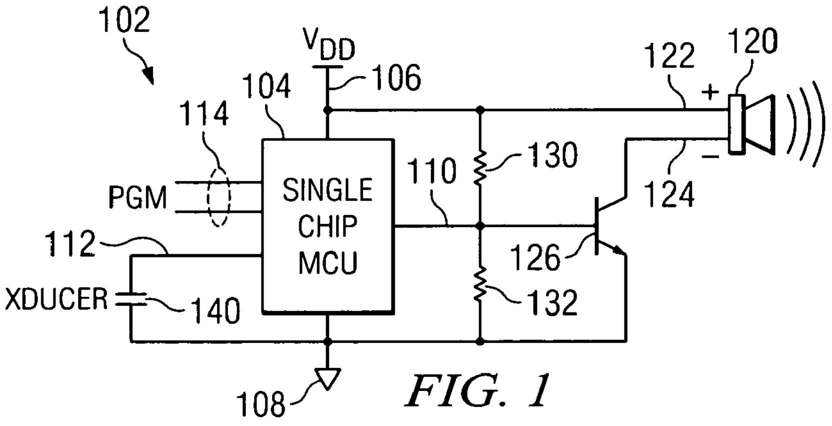
FIG. 1 illustrates an overall block diagram of the single-chip speaking thermometer.

Referring now to FIG. 1, there is illustrated a block diagram of a single-chip speaking thermometer 102. The single-chip speaking thermometer has at the heart thereof a single-chip microcontroller unit (MCU) 104. This is of a type C8051FXXX, manufactured by Silicon Laboratories Inc. These microcontroller units have disposed thereon, as will be described herein below, memory, processing capabilities, analog-to-digital data conversion capability, digital-to-analog data conversion capability, clock circuitry and timers. The MCU 104 at the chip level has a plurality of potential functions that can be performed thereby. Thus, there are a number of available pin-out configurations that are available. However, for this particular application, the single-chip MCU requires minimal pin-out provisions. There will be required a supply terminal 106, a ground terminal 108, a driving terminal 110 and an interrupt or reset input 112. Additionally, there will be optionally provided the ability to program the MCU 104 through a program interface 114. As will be described herein below, the MCU 104 contains Flash memory and this is programmed with this particular integrated circuit through a JTAG interface. This requires approximately four outputs. Thus, the single-chip MCU 104 requires only four terminals for the overall functionality and possibly some programming input or interface. However, the MCU 104 could be mask programmed, thus not requiring the program interface.

The output node 110 is operable to drive a speaker 120. This speaker can be a piezoelectric or piezoceramic speaker that operates on relatively low voltage and a low current. These are relatively small and inexpensive speakers used for portable mobile communication products, hearing aids and the such. The output of the speaker depends upon the current driven thereto. In general, the piezoceramic speakers appear as a capacitive load and have a positive terminal 122 and a negative terminal 124. The positive terminal 122 will typically be connected to the supply terminal 106 and the other terminal, the negative terminal 124, is connected to one side of an active driving device such as an NPN transistor 126 that is connected between negative terminal 124 and ground. The base of transistor 110 is driven by the driving terminal 110, which provides an analog voltage on the output thereof. There can be provided bias resistors 130 and 132 to bias the transistor 126. It should be understood that any type of driving device can be provided to drive the analog output to the speaker 120. Further, it should be understood that any type of speaker could be utilized, it being understood that the output on terminal 110 is an analog output terminal. Alternatively, a digital output could be used to drive the speaker, but this would provide only a limited amount of audible capabilities and would not provide as high a fidelity output as an analog driving signal. The input reset for interrupt terminal 112 is connected to one side of the transducer 140. This transducer is operable to generate some type of reset signal, be it a DC reset signal or a change in a voltage level. This can be detected by comparators on board the MCU 104 that will interrupt the operation and indicate to the processing system inside the MCU 104 that a temperature output is requested.

There are a number of ways an input signal can be generated for the purpose of providing an input signal to the CPU 202 as an interrupt. One way is to provide two conductive terminals accessible external to the packaged device, as will be described herein below, and connect one terminal the node 112 and the other terminal to ground. A large resistor will then be connected between the terminal 112 and $V_{DD}$, such that placing a finger across the conductive terminals will provide enough current to "pull" the terminal 112 to ground and change the output state of the comparator 222. The conductive terminals have to be exposed to the exterior of the housing, however. Another input could be a capacitively coupled off of the collector of the transistor 126, which will be filtered for input to the terminal 112. This will allow for an audio input to generate a sufficient signal to trigger the comparator 220.

In one operational mode, the MCU 104 is placed into a Halt mode, wherein reduced power is drawn due to the fact that the digital processing section is not being clocked, i.e., there are no digital transitions occurring. When the processing system receives the interrupt, it then internally measures a temperature dependant voltage of the MCU 104, determines the temperature from a look up table, looks up an audio file that corresponds to the determined temperature, creates an audio output and outputs that audio output in the analog domain to the speaker. As will be described further herein below, the MCU 104 is a mixed-signal device that allows for processing to occur in the digital domain, but output information in the analog domain and sense analog input parameters. In another mode, the MCU 104 runs continuously and periodically outputs temperature information to the speaker, as will be described herein below. During the interim periods in this continuous mode of operation, the MCU 104 can be powered down to conserve battery life, as the single-chip MCU utilizes an integrated battery, and this integrated battery, in one embodiment is not replaceable, i.e., the entire device is disposable.

Figure 2:
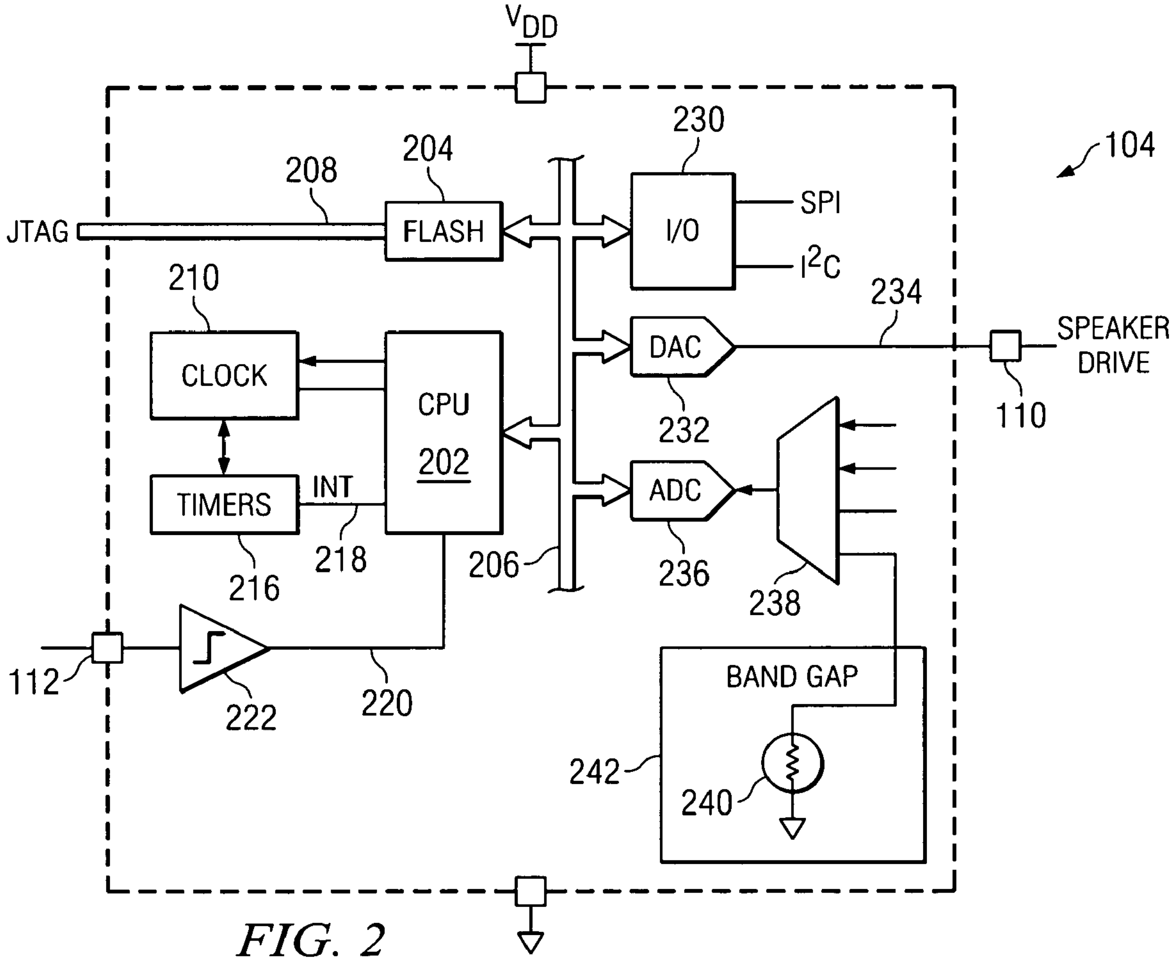
FIG. 2 illustrates a block diagram of the integrated circuit associated with the single-chip thermometer.

Referring now to FIG. 2, there is illustrated a diagrammatic view of the internal architecture for the single-chip MCU 104. At the heart of the MCU is a central processing unit (CPU) 202 which is an 8051 type microprocessor. This microprocessor is operable to execute instructional code that is stored in a Flash memory 204 or in other on-board ROM (not shown), all of this memory being non-volatile. The CPU 202 interfaces with the Flash memory 204 through an internal bus 206. The Flash memory 204 can be programmed with a JTAG interface through a JTAG bus 208. The CPU 202 operates on a clock 210, which clock operates at various frequencies. Typically, processing capability having the speed necessary to determine and assemble the necessary audio information for output from the MCU 104 may require a clock speed on the order of 25 MHz. The clock 210 is operable to generate such a clock without the use of a crystal. There is provided an internal precision oscillator that can generate the clock frequency within +/−2% of the correct operating frequency. However, for this application, the accuracy of the clock is not important, it being recognized that this clock frequency will drift somewhat over temperature. The clock circuit 210 has associated therewith timers 216 which can be clocked by the clock 210 and keep track of count values. These timers can provide interrupts out to the CPU on a line 218. Also, the CPU can generate a command to the clock 210 that will cause the clock 210 to Halt its operation such that it does not draw current, the MCU 104 halted such that the last processing state is maintained intact, such that, upon resumption of the clocking operation thereof, the CPU 202 will begin processing at the last place in its operation.

In one mode, only the CPU 202 will be halted, the clock 210 allowed to run and clock the timers 216. When the timers 216 reach preset threshold, an interrupt can be generated to wake the CPU 202. In the other mode, where the entire operation is halted, the clock 210 is suspended, the timer 216 is suspended and the CPU 202 is suspended until an external interrupt on a line 220 is received, this being provided by the output of a comparator 222 which senses the output on the terminal 112. When a reset input or some type of input is provided on the terminal 112, the comparator 222 compares the received input signal to an internal threshold which is programmable and then returns the CPU 202 to a full operating mode. Typically, the CPU 202 will be placed in a mode such that it retains its last state, i.e., it is still powered, but not undergoing digital transitions.

The MCU 104 also includes an input/output section 230, which provides for various serial interface types such as SPI, $I^2C$, and other various serial interfaces. These are not utilized for this application, but they could be utilized although it is not necessary to utilize these serial interfaces for driving an output speaker. There is also provided a digital-to-analog converter (DAC) 232 which provides a single analog output on a line 234, which is associated with the terminal 110. This provides the analog output driving signal, i.e., the speaker drive signals. There is also provided an ADC 236, which is operable to receive an analog input from a multiplexer 238, which can sample multiple inputs. None of these inputs are interfaced in this application to the exterior of the circuit. Typically, when the system is in a low power mode, the ADC 236 is powered down, i.e., it is not sampling the input. Thus, for a low power operation, it is more desirable to utilize a combinatorial logic circuit such as the comparator 222 for the purpose of determining if a reset or some type of external low power indicator is provided to the part. However, the multiplexer 238 is interfaced with a temperature sensing element 240, which is basically a PTAT voltage provided on the output of a band gap generator 242. The band gap generator 242 is a conventional circuit that provides voltage and temperature independent stable voltages for the operation of the integrated circuit. Internal to this is a voltage that is temperature dependent and this voltage has a characteristic that is well known and can be utilized for calculating temperature (or utilizing a look up table (LUT) for such determination). This temperature sensing element is internally connected to one input of the multiplexer 238 for being sampled by the ADC 236. Therefore, a digital representation of the PTAT voltage can be determined internal to the chip, without requiring a separate input and output pin. This will provide the temperature of the chip. Since the chip draws a variable current, the temperature on startup will reach its operating temperature very quickly and this will constitute a delta above ambient temperature. With pre characterization data and lookup tables, the voltage output from the temperature sensing element 240 can be correlated with the actual temperature.

With use of the Flash 204, there can be provided a significant amount of storage on this single-chip solution that allows for storage of various lookup tables and the such. The storage of these lookup tables allows for storage of characterization tables for the temperature sensing element 240, WAV files and instruction code for the CPU 202.

Figure 3:
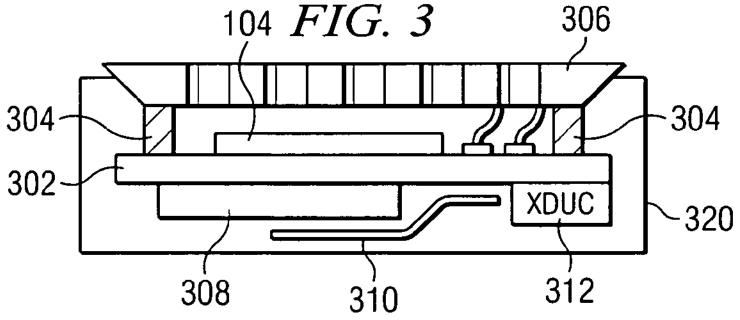
FIG. 3 illustrates a side view of the construction of the single-chip thermometer.

Referring now to FIG. 3, there is illustrated a cross-sectional view of the single-chip speaking thermometer as a single integrated unit. There is provided a substrate 302 for mounting the MCU 104 thereon. The substrate 302 can be a resin type substrate, i.e., a PC board. Mounted on the PC board with mounting structures 304 is a piezoelectric piezoceramic transducer 306, i.e., the speaker. There are a number of speakers that will provide for this functionality, such as the WM-R30B card type piezoceramic speaker manufactured by Panasonic. These are relatively small and provide good fidelity. However, the application herein will drive these speakers with very low voltages and currents and, therefore, the fidelity is not of concern. A battery 308 will be disposed on the lower surface of the substrate 302 and will be connected thereto with power supply contacts 310. A transducer 312 will also be disposed on the substrate 302. This transducer 312 can be any type of transducer. It could be a capacitive transducer that senses capacitance and changes the output in response thereto. It could be an optical transducer that will provide an output voltage. However, transducers that utilize pressure or capacitance change are desirable since they will draw the least amount of current. Any type of transducer could be utilized for providing an indication of an external input for requesting a temperature reading. Further, there could be a mechanical switch that is provided that would actually connect the supply voltage to the MCU 104. The entire structure of FIG. 3 is enclosed in and enclosure 320, that could actually be a "potted" enclosure allowing for openings to the pressure surface of the speaker. This would provide for a totally enclosed device wherein the battery could not be changed and it would be disposable.

Figure 4:
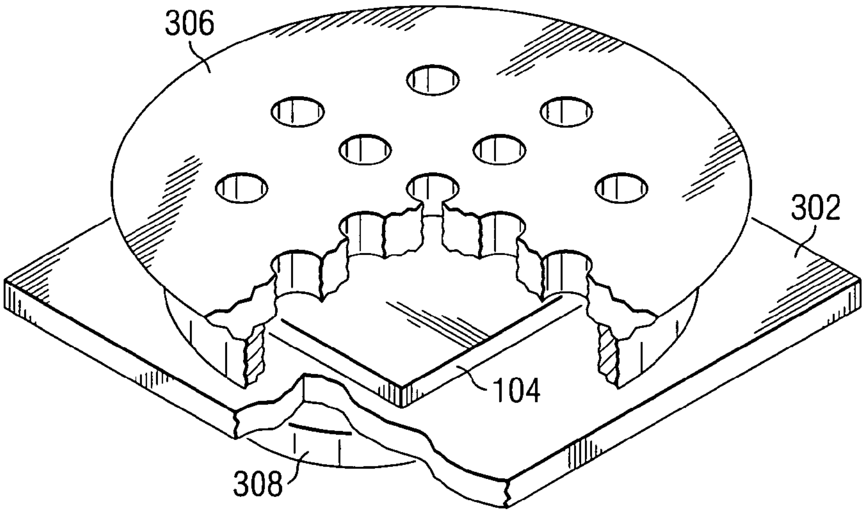
FIG. 4 illustrates a perspective view of the embodiment of FIG. 3.

Referring now to FIG. 4, there is illustrated a perspective view of the single-chip speaker thermometer of FIG. 3. This is illustrated without the resin or enclosure 320.

Figure 5:
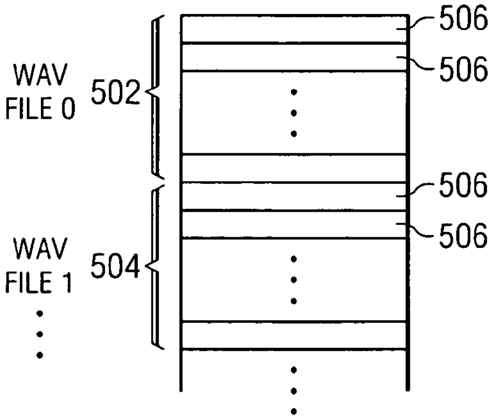
FIG. 5 illustrates a memory map for the WAV files.

Referring now to FIG. 5, there is illustrated a memory map for storage of the information that is provided in Flash memory 204 for the purpose of storing WAV files. WAV files are audio formatted files that allow for the storage of audio information. These are sound files that enable one to hear and play music, providing a compressed audio file. This has generally become a standard PC audio file format for everything from system and game sounds to CD-quality audio. A WAV file is identified by a file named extension of WAV (.wav). In general, this allows content developers to freely use the audio files between flat form for processing, for storage and later reproduction, etc. The WAV file, in addition to providing uncompressed raw audio, also stores information about the file's number of tracks, sample rate and bit depth. Each of the files, there being multiple files, has recorded therein certain information that can either be recorded from a human voice or it can actually be synthesized. It will be such things as the term "temperature," the various numbers, etc. Any type of information could be contained in these WAV files for output therefrom. Illustrated are two WAV files 502 and 504 labeled "WAV File0" and "WAV File1" that are each comprised of a plurality of bits disposed in fields 506. Each of the fields has a certain bit length, depending upon the width of the memory. These bits are output in a streaming format, but could have word boundaries. This, of course, is in accordance with the WAV format. Each WAV file is identified by the pointer to the address at the beginning thereof. Once the WAV file is output, each field 506 is accessed and output therefrom. Therefore, it is only necessary to know the beginning address and the ending address of the WAV file in order to fetch it from memory.

Figure 5A:
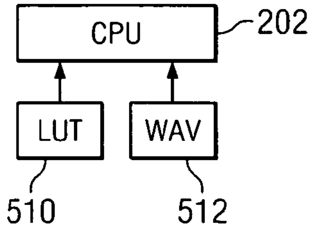

Referring now to FIG. 5*a*, there is illustrated a block diagram of the operation wherein the CPU 104 accesses two memory locations for the purpose of communicating temperature information. The first is to access a lookup table 510 which provides information as to the output of the band gap generator and temperature. Once the PTAT output voltage of the band gap generator is determined, this voltage can then be associated with a temperature and is utilized to then select one of the WAV files from a WAV storage area 512. The LUT 510 is operable to contain pre-stored information that is the result of characterization data for the band gap generator. The WAV file 512 is comprised of, as noted herein above, prerecorded information which could be of any length. Although the disclosed embodiment is involved with temperature, it should be understood that any type of information such as an advertisement or the such could be output and the sensed parameters could be any sensed parameters, such as barometric pressure, humidity, etc.

Figure 6:
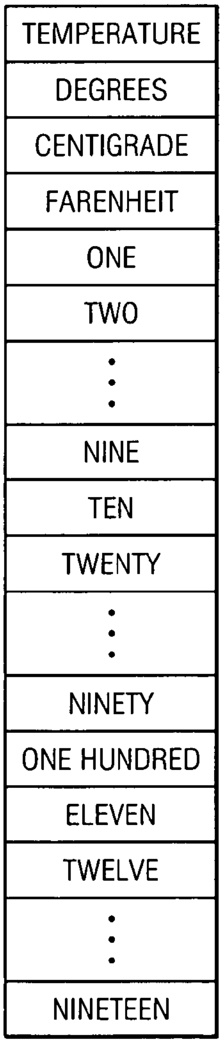
FIG. 6 illustrates a diagrammatic view of the WAV files that are stored.

Referring now to FIG. 6, there is illustrated a diagrammatic view of the memory map for the Flash 204 associated with the WAV files illustrating the content of the WAV files. It can be seen that the type of information that will be recorded would be the spoken forms of the term "temperature," "degrees," "centigrade," and "Fahrenheit." These will allow a spoken output of, for example, a "TEMPERATURE FIFTY TWO DEGREES FAHRENHEIT." The numbers are merely assembled from segmented recorded spoken words, such as the numbers 1-10, 11-19, 20, 30, 40, . . . , 90 and 100. These are all the numbers that are required in order to output a temperature value in a spoken form, this being the minimal level. Of course, each temperature or fraction thereof could be recorded in and of itself. This merely would require significantly more memory. For a low cost part, the memory will be minimized. However, the CPU 104 must, after determining the temperature, assemble the particular WAV files, execute the appropriate instructions to output these WAV files in the correct order and at the correct time. Further, as will be noted herein below, the CPU 202 is also operable to control the power management aspect of the part, this being an inherent feature of the part noted herein above.

Figure 7:
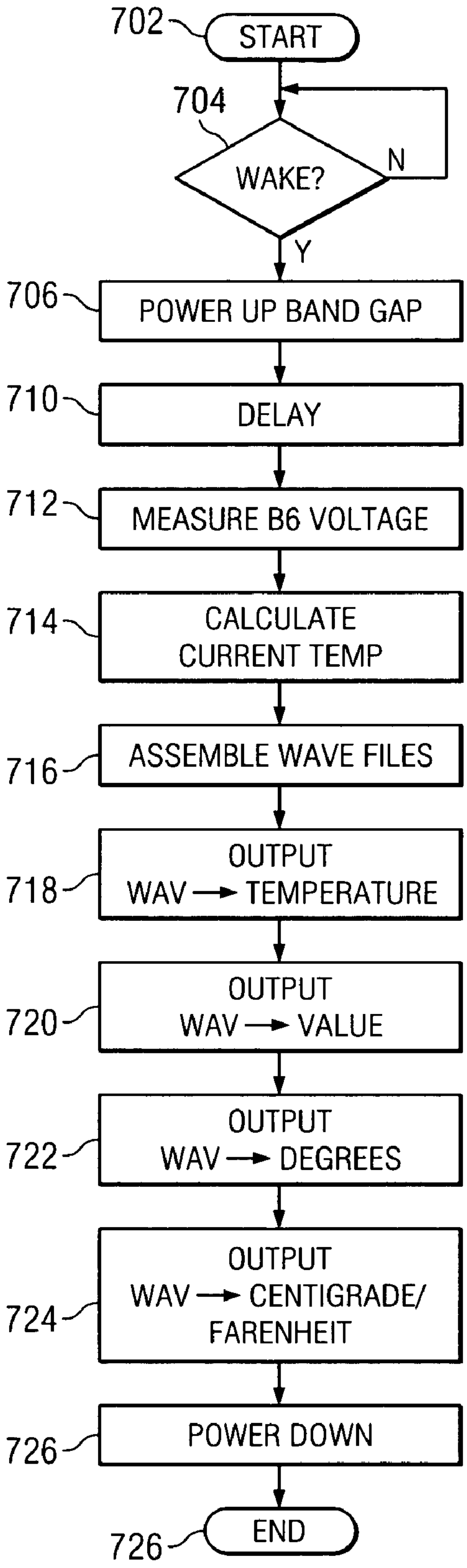
FIG. 7 illustrates a flow chart depicting the overall operation of the system.

Referring now to FIG. 7, there is illustrated a flow chart depicting the overall operation of the MCU 104. This is initiated at a block 702 and then proceeds to a decision block 704 to determine if the part is to be woken up. Initially, the part will be in a low power mode wherein all of the operating functions are halted or possibly just the oscillator is running for timing considerations. If it is in the low power mode, there will be some external disturbance such as user activation of the transducer through some capacitive change, etc., that will cause an interrupt to be provided to the CPU 202. When this interrupt is provided to the CPU 202, the program will flow along the "Y" path to a function block 706 to initially power up the band gap circuit at the least. This will allow the temperature therein to stabilize. However, for the power up operation, the entire chip will be powered up such that the processor is running at processing speed, the clocks are running, etc. The program will then flow to a function block 710 for a predetermined amount of delay. This will allow the entire chip to come to operating temperature and stabilize for the temperature measurement. The program will then flow to a function block 712 in order to measure the band gap voltage, the PTAT voltage. This voltage will be utilized to determine the current temperature through the use of the lookup table 510. This is noted in a function block 714. Once the temperature is determined from the lookup table, the program then flows to a function block 716 to assemble the appropriate WAV files. The first WAV file that is output is the spoken word "temperature," as indicated by a function block 718. The next WAV file that is output is that associated with the output value which can be an assembly of multiple WAV files. For example, the temperature 125 would actually require the output of the spoken word "one hundred," followed by the spoken word "twenty," and that followed by the spoken word "five." This is indicated by a function block 720. Once the value is output, then the program flows to function block 722 wherein the WAV file associated with the spoken word "degrees" is output to the speaker. The program then flows to a function block 724 to output the WAV file associated with the term "centigrade" or "fahrenheit." The program then flows to a function block 726 to power down and go back into the low power mode or power conserving mode. The program then flows to an END block 726 to await the next wake-up signal. It can therefore be seen that a single-chip module having battery power associated therewith in a single enclosure can be provided with a minimal parts count to provide user activated voice output temperature measurement capabilities.

Figure 8:
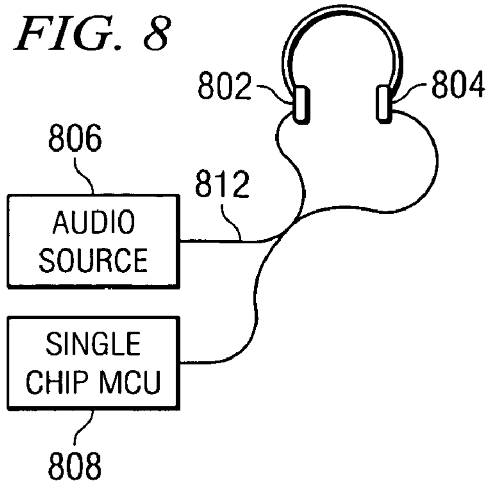
FIG. 8 illustrates an alternate embodiment wherein the single-chip thermometer is summed with another audio source to drive speakers.

Referring now to FIG. 8, there is illustrated an alternative embodiment wherein a set of speakers 802 and 804 are provided in, for example, a headset. These are driven normally by an audio source 806, which provides music or the such to a user. However, a separate module 808, the single chip temperature measuring MCU, is provided which is summed with the cord 812 delivering audio from the audio source 806 to the speakers 802 and 804. This could merely be through a "Y-connector" that can allow summing of the signals. The output of the MCU 808 would have to have the capability to drive the fairly low impedance speakers, these being 8-ohm speakers. The overall power level required to drive such speakers would be relatively low, due to the fact that they are low power speakers.

Figure 9:
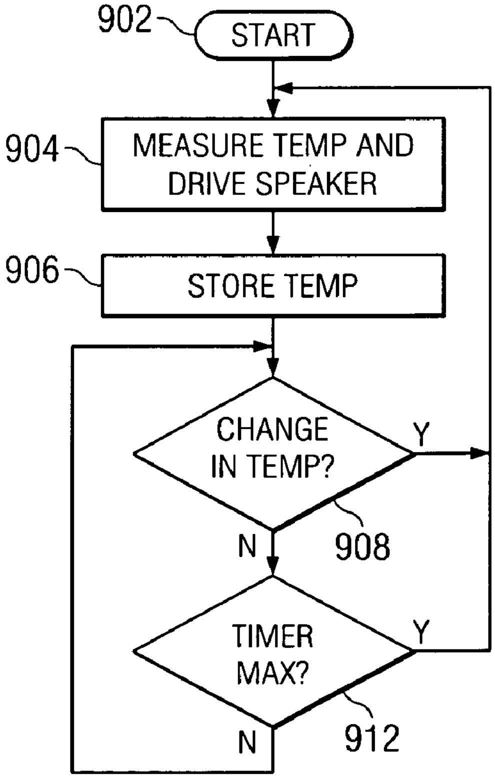
FIG. 9 illustrates a flow chart for a continuous running embodiment.

Referring now to FIG. 9 there is illustrated a flow chart depicting an alternate operational mode of the MCU 102. This is initiated at block 902 and then proceeds to a function block 904. At block 904, the MCU 102 remains in a constant loop mode wherein it is always measuring temp and driving the speaker with the appropriate temperature output information. There will be a time delay associated therewith. However, once the module is staffed or powered up and an output provided, the program then flows to a function block 906 to store the temperature. The program then flows to a decision block 908 to determine if there has been a change in temperature. If no change in temperature has occurred, the program will flow along the "N" path. However, if a change in temperature had occurred by a predetermined number of degrees, the program will flow along the "Y" path to the function block 904 to again measure the temperature and drive the speaker. The temperature is continually being measured, however. If there has been no change in temperature, the program will flow from the decision block 908 along the "N" path to a timer decision block 912 wherein it will be determined if a timer has maxed out. If so, the program will flow along a "Y" path to measure the temperature and drive the speaker and, if not, the program will flow along the "N" path back to the input of the block 908.

For power conserving purposes, the MCU 102 can operate in a number of different modes. In one mode, the CPU 104 can be powered down and the clock remain running such that the timer will be incremented. Further, the oscillator can actually run at a lower frequency such as 32 kHz to further conserve power. There will be an alarm function provided in the timer circuitry 218 that, when the count value equals a certain value, an interrupt will be generated to the CPU 202, initiating the processing of the temperature information and output of WAV files and driving the speaker. In another mode, the analog-to-digital converter can be maintained in a mode wherein it will be operational at certain periods of time to perform sampling to determine temperature. Therefore, the MCU 104 does not need to be powered up entirely to continue taking samples. It can be woken up periodically with a timer to take the samples and determine if there is a change in temperature. Typically, the MCU 104 utilizing the part number C8051FXXX will have multiple timers therein and one could be utilized for a total time-out value such that temperature is output at periodic intervals and also to allow the CPU 202 to wake up and measure for changes in temperature. However, as noted herein above, the MCU 104 could be run continuously, as the power required for such operation is minimal compared to the power required to drive the speaker, this being the primary power draw.

Although the preferred embodiment has been described in detail, it should be understood that various changes, substitutions and alterations can be made therein without departing from the spirit and scope of the invention as defined by the appended claims.

What is claimed is:

1. A portable self contained parameter sensing unit for sensing environmental parameters and communicating such to a user, comprising:

a housing;

an output audio transducer for conveying audio information to the user identifying a current predetermined environmental parameter of a range of predetermined environmental parameters;

an integrated circuit chip having:

a mixed signal integrated on-chip environmental sensor for sensing the current predetermined environmental parameter in the analog domain, an on-chip analog-to-digital data converter for converting said sensed current predetermined environmental parameter in the analog domain to the digital domain as a digital sensed environmental parameter;

an integrated on-chip memory for storing information in the digital domain for storing at least digital representations of the audio information as translation parameters, and program instructions, an on-chip instruction based integrated processing unit for processing in accordance with the stored program instructions the sensed current predetermined environmental parameter in the digital domain in accordance with the translation parameters stored in said integrated on-chip memory for conversion such that the digital value of said sensed environmental parameter is translated into a translated value of the stored digital representations that enables playing of the audio information identifying the current predetermined environmental parameter of the range of predetermined environmental parameters;

an on-chip driver for driving said output transducer disposed off-chip to convey the audio information identifying the current predetermined environmental parameter of the range of predetermined environmental parameters responsive to a signal representing said digital value of said translated sensed environmental parameters;

a power source for powering said integrated circuit and said output transducer;

wherein said audio transducer, said integrated circuit and said power source are contained in said housing; and a power conservation control circuit for powering down a portion of said integrated circuit while maintaining said environmental sensor in a powered state such that it is disposed at substantially the operating temperature of the integrated circuit chip and said control circuit including a timing circuit for periodically powering up said portion to determine if there has been a change in the sensed environmental parameter such that said processing unit can cause output of updated audio information to said output transducer.

2. The portable unit of claim 1, wherein said translated value comprises a recorded signal representing the current predetermined environmental parameter in spoken words.

3. The portable unit of claim 2, wherein said transducer comprises a speaker for conveying said recorded signal to the user.

4. The portable unit of claim 2, and further comprising an on-chip digital-to-analog data converter for converting said translated value in the digital domain to a translated value in the analog domain.

5. The portable unit of claim 4 wherein said translation parameters comprise stored audio files that correspond to said range of predetermined environmental parameters.

6. The portable unit of claim 5, wherein the audio files are WAV files.

7. The portable unit of claim 1, wherein the environmental parameters comprise temperature parameters.

8. The portable unit of claim 1, wherein said translation parameters comprise first translation parameters for translating the output of said sensor to a digital sensed temperature value associated with a corresponding temperature value and second translation values for translating said digital temperature value to an audible output value corresponding to said digital sensed temperature value.

9. The portable unit of claim 8, wherein said first translation parameters comprise a look up table stored in said memory for associating sensed temperature values output by said temperature sensor with actual temperature values as digital sensed temperature values, and said processing unit is operable to perform a lookup operation to fetch said associated digital sensed temperature value upon initiating a sensing operation.

10. The portable unit of claim 9, wherein said second translation values comprised predetermined audio files stored in said memory for associated spoken audio with digital sensed temperature values, said processing unit operable to fetch said appropriate audio files from said memory after one of said digital sensed temperature values is selected from said look up table.

11. The portable unit of claim 10, wherein said audio files are digital representations of the spoken words stored in a compressed audio format and each digital sensed temperature values requires said processing unit to assemble for output at least two of said audio files.

12. The portable unit of claim 1, wherein said portion comprises said processing unit.

13. The portable unit of claim 12, wherein said portion further includes said analog-to-digital data converter.

* * * * *